US012704354B2

(12) United States Patent
Fu et al.

(10) Patent No.: US 12,704,354 B2
(45) Date of Patent: Aug. 11, 2026

(54) SHOOTING DEVICE, SIGHTING APPARATUS, IMAGING RANGEFINDER AND ADJUSTING METHOD THEREOF

(71) Applicant: SHENZHEN RUIERXING ELECTRONIC CO., LTD., Shenzhen (CN)

(72) Inventors: Luxin Fu, Shenzhen (CN); Zhicheng Xing, Shenzhen (CN)

(73) Assignee: SHENZHEN RUIERXING ELECTRONIC CO., LTD., Shenzhen (CN)

( * ) Notice: Subject to any disclaimer, the term of this patent is extended or adjusted under 35 U.S.C. 154(b) by 868 days.

(21) Appl. No.: 18/096,015

(22) Filed: Jan. 12, 2023

(65) Prior Publication Data

US 2023/0144958 A1 May 11, 2023

Related U.S. Application Data

(63) Continuation of application No. PCT/CN2020/105983, filed on Jul. 30, 2020.

(51) Int. Cl.

*F41G 1/473* (2006.01)
*F41G 3/06* (2006.01)
*G01C 3/04* (2006.01)
*G01S 17/89* (2020.01)

(52) U.S. Cl.

CPC ............ *F41G 1/473* (2013.01); *F41G 3/065* (2013.01); *G01C 3/04* (2013.01); *G01S 17/89* (2013.01)

(58) Field of Classification Search

None

See application file for complete search history.

(56) References Cited

U.S. PATENT DOCUMENTS

2016/0290765 A1* 10/2016 Maryfield ................ F41G 1/30

FOREIGN PATENT DOCUMENTS

CN 102252563 A 11/2011
CN 105300186 A 2/2016

* cited by examiner

*Primary Examiner* — Luke D Ratcliffe

(57) ABSTRACT

The present disclosure relates to a shooting device, sighting apparatus, imaging rangefinder and adjusting method thereof. The imaging rangefinder capable of being adjustably mount on a sighting telescope, comprising a power supply, a control module electrically connected to the power supply, an imaging module electrically connected to the control module, a ranging imaging module electrically connected to the control module, and a display module electrically connected to the control module, and an eyepiece system showing an image shown by the display module, wherein an image from the sighting telescope is transmitted to the control module via the imaging module, the image shown by the display module comprises the image from the sighting telescope, an image from the ranging imaging module, and ranging information and ranging aiming point from the ranging imaging module.

16 Claims, 7 Drawing Sheets

SHOOTING DEVICE, SIGHTING APPARATUS, IMAGING RANGEFINDER AND ADJUSTING METHOD THEREOF

CROSS-REFERENCE TO RELATED APPLICATIONS

The present application is a Continuation Application of PCT Application No. PCT/CN2020/105983, filed on Jul. 30, 2020, the entire contents of which are hereby incorporated by reference.

TECHNICAL FIELD

The present disclosure relates to the field of photoelectric technology, and particularly to a shooting device, sighting apparatus, imaging rangefinder and adjusting method thereof.

DESCRIPTION OF THE PRIOR ART

A sighting apparatus is used as an indispensable auxiliary tool for a shooting device such as a bow, an arrow, a gun, etc., which can effectively help a user to improve shooting accuracy. However, a common optical sighting apparatus estimates a distance of a target by means of scribe lines on a reticle of the sighting apparatus, which has great subjectivity and limitation, so that it is difficult to avoid errors. In recent years, with the development of laser technology, laser ranging technology has been applied to sighting apparatuses, which greatly improves accuracy and speed of ranging. However, since a laser rangefinder is located outside an sighting apparatus, a user needs to observe back and forth between the sighting apparatus and the laser rangefinder, and obtain a final data through comprehensive calculation according to experience or a specific algorithm, which is relatively troublesome.

SUMMARY OF THE DISCLOSURE

In view of the above, the present disclosure provides an imaging rangefinder capable of solving or optimizing the above problems, a sighting apparatus having the imaging rangefinder, a shooting device having the sighting apparatus, and a method for adjusting the aiming base point.

The present disclosure provides an imaging rangefinder capable of being adjustably mount on a sighting telescope, comprising a power supply, a control module electrically connected to the power supply, an imaging module electrically connected to the control module, a ranging imaging module electrically connected to the control module, and a display module electrically connected to the control module, and an eyepiece system showing an image shown by the display module, wherein an image from the sighting telescope is transmitted to the control module via the imaging module, the image shown by the display module comprises the image from the sighting telescope, an image from the ranging imaging module, and ranging information and ranging aiming point from the ranging imaging module.

In some embodiments, the imaging module comprises a first reflecting system and a first imaging sensor, optical paths of the image from the sighting telescope are folded and reflected by the first reflecting system to the first imaging sensor, and the first imaging sensor converts an optical signal into an electrical signal and transmits the electrical signal to the control module.

In some embodiments, the first reflecting system comprises a first reflecting mirror arranged behind an eyepiece of the sighting telescope and at least one second reflecting mirror which is arranged between the first reflecting mirror and the eyepiece of the sighting telescope.

In some embodiments, the ranging imaging module comprises a laser ranging unit, an imaging unit, and a second imaging sensor, the laser ranging unit is electrically connected with the control module to provide the ranging information and the ranging aiming point, and the second imaging sensor converts an optical signal from the imaging unit into an electrical signal, and transmits the electrical signal to the control module.

In some embodiments, the laser ranging unit comprises a laser emitting unit for emitting a laser beam to a target and a laser receiving unit for receiving a reflected laser beam, and the imaging unit is configured to receive natural light and form an image, and the laser emitting unit forms a laser emitting optical path, the laser receiving unit forms a laser receiving optical path, and the imaging unit forms a natural light observation optical path, an axis of the laser emitting optical path, an axis of the laser receiving optical path, and an axis of the natural light observation optical path are coaxial with each other, and three axes overlap each other.

In some embodiments, the laser emitting unit comprises a dichroic mirror for reflecting laser and allowing natural light to pass therethrough, the imaging unit comprises the dichroic mirror and an imaging mirror for condensing natural light, and the second imaging sensor receives natural light condensed via the imaging mirror.

In some embodiments, the ranging imaging module further comprises an infrared source unit for providing night-vision infrared illumination for the sighting telescope and the imaging unit.

In some embodiments, the display module comprises a display driver board and a display screen mounted on the display driver board, the display driver board is electrically connected to the control module, and a data of the control module is read and sent to the display screen for display.

In some embodiments, the image and data shown on the display screen are refracted and turned by the eyepiece system, and then projected from the imaging rangefinder along an optical path of the sighting telescope.

In some embodiments, the eyepiece system comprises a second reflecting system and a plurality of lenses.

In some embodiments, the second reflecting system comprises a third reflecting mirror and at least one fourth reflecting mirror, and the plurality of lenses are arranged between the third reflecting mirror and the at least one fourth reflecting mirror.

In some embodiments, the imaging rangefinder further comprised a housing which accommodates the power supply, the control module, the imaging module, the ranging imaging module and the eyepiece system, the housing is connected with the sighting telescope by a first adjusting element provided inside the housing, and the housing is rotatable relative to the first adjusting element to adjust a position of the imaging module relative to the sighting telescope, so that an optical axis of the imaging rangefinder and an optical axis of the sighting telescope are coaxial.

In some embodiments, the ranging imaging module is movably assembled in the housing through a second adjusting element, so that a position of the ranging imaging module relative to the sighting telescope is adjusted.

In some embodiments, the housing is provided with a lateral moving mechanism and a longitudinal moving mechanism for driving the second adjusting element to move relative to the housing in the lateral and longitudinal directions, respectively.

The present disclosure also provides a sighting apparatus comprising a sighting telescope and an imaging rangefinder connected with the sighting telescope, wherein the imaging rangefinder is the above imaging rangefinder.

The present disclosure further provides a method for adjusting an aiming base point of a sighting apparatus comprising a sighting telescope and an imaging rangefinder connected with the sighting telescope, wherein the method comprises:

controlling the control module through buttons provided on the housing; and moving a position of a display icon of the display module under the control module in order to move an aiming point of the imaging rangefinder shown in the display module to a center of a sight radius of the sighting telescope, so that the aiming point of the imaging rangefinder coincides with the center of the sight radius of the sighting telescope.

The present disclosure also provides a shooting device comprising a gun and a sighting apparatus mounted on the gun, wherein the sighting apparatus is the above sighting apparatus.

The present disclosure also provides a method for adjusting a shooting base point of a shooting device, wherein the method comprises:

- adjusting an aiming point of the imaging rangefinder to coincide with a center of a sight radius of the sighting telescope;
- adjusting the center of sight radius of the sighting telescope to coincide with a trajectory of the gun, so that the sighting apparatus and the gun are zeroed at a certain distance, and adjusting mechanisms of the sighting telescope is locked;
- correcting distance and windage by controlling the aiming point of the imaging rangefinder on the display module by buttons provided on the housing; and
- returning the aiming point of the imaging rangefinder back to the center of the aiming base line of the sighting telescope that has been locked after hitting the target to achieve a second zeroing of the sighting device.

The present disclosure further provides a method for adjusting a shooting base point of a shooting device according to claim 15, wherein the method comprises:

a. adjusting an aiming point of the imaging rangefinder to coincide with a center of a sight radius of the sighting telescope;

b. adjusting the center of sight radius of the sighting telescope to coincide with a trajectory of the gun, so that the sighting apparatus and the gun are zeroed at a certain distance;

c. opening a teaching mode menu of the sighting telescope, and at the same time hitting a target at other distance with a gun zeroed at a certain distance, and displaying an impact point on the display module after the hitting is completed;

d. manually adjusting the aiming point of the imaging rangefinder to the impact point of the other distance, and completing the recording;

e. repeating steps c and d for a target at a distance different from the certain distance; and f. automatically adjusting the aiming point of the imaging rangefinder according to a value measured by the imaging rangefinder under the control module of the imaging rangefinder when the shooting device exiting the teaching mode starts hitting the target, and hitting the target according to the aiming point of the imaging rangefinder.

Comparing with the prior art, the imaging rangefinder of the sighting apparatus of the present disclosure displays a ranging data collected by the imaging rangefinder together with an image data observed by the sighting apparatus on a display, so that a user can observe all the required data through the eyepiece, which is simple and convenient, fast and effective to use.

Figure 1:
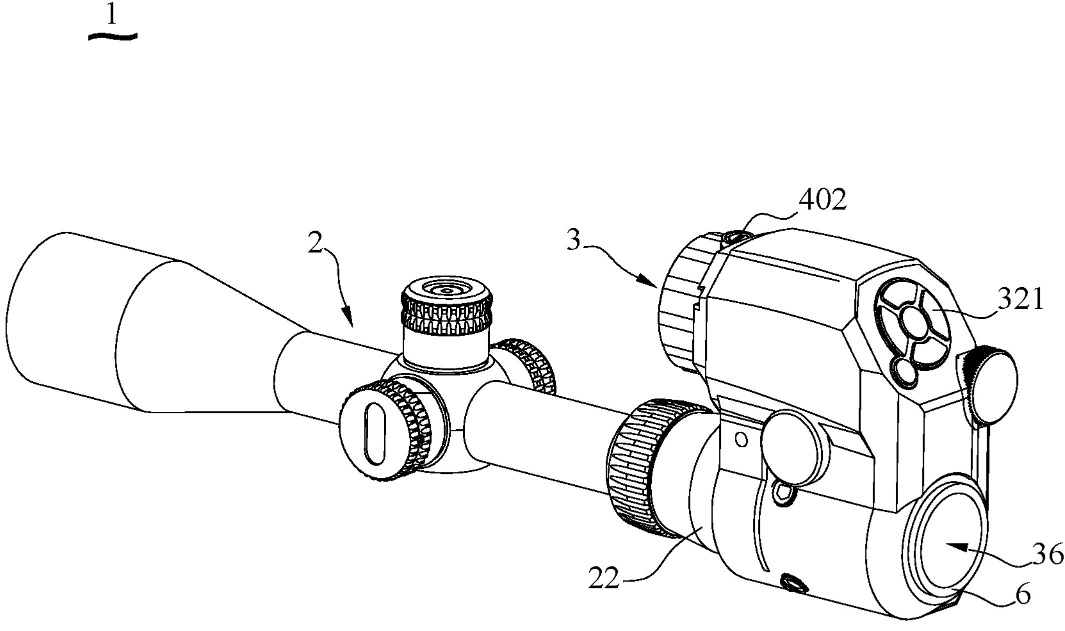
FIG. 1 is an assembled perspective view of an embodiment of an sighting apparatus according to the present disclosure.

Reference numerals: 1 sighting apparatus; 2 sighting telescope; 21 eyepiece; 22 eyepiece sleeve; 3 imaging rangefinder; 30 housing; 301 engaging portion; 302 body; 303 closing end; 304 leg; 305 connecting portion; 306 screw; 31 power source; 32 control module; 321 button; 33 imaging module; 331 first reflecting system; 332 first imaging sensor; 3331 first reflecting mirror; 3333 second reflecting mirror; 3332 third reflecting mirror; 3334 fourth reflecting mirror; 34 ranging imaging module; 340 second adjusting element; 401 lateral moving mechanism; 402 longitudinal moving mechanism; 403 second ball head; 404 main body; 405 recess; 341 laser ranging unit; 411 laser emitting unit; 111 dichroic mirror; 112 laser reflecting mirror; 113 laser emitting mirror; 412 laser receiving unit; 121 laser receiving mirror; 342 second imaging sensor; 343 imaging unit; 431 fifth reflecting mirror; 432 imaging mirror; 344 infrared source unit; 35 display module; 351 display driver board; 352 display screen; 521 image display area of the sighting telescope; 522 laser ranging indication display area; 523 sight radius of the sighting telescope; 524 aiming point of the imaging rangefinder; 36 eyepiece system; 361 second reflecting system; 362 lens; 621 coupling mirror; 622 glass sheet; 37 first adjusting element; 371 first ball head; 372 cavity; 373 opening; 4 shooting device; 41 gun; 42 impact point; 5 target; 6 eyepiece hood.

DDESCRIPTION OF EMBODIMENTS

In order to facilitate understanding of the present disclosure, the present disclosure will now be described more fully with reference to the drawings. One or more embodiments of the present disclosure are shown by way of example in the drawings, in order to provide a more accurate and thorough understanding of the disclosed technical solution. However, it should be understood that the present disclosure may be realized in many different forms and is not limited to the embodiments described below.

Figure 2:
FIG. 2 is a schematic structural view of an imaging rangefinder of the sighting apparatus shown in FIG. 1.
Figure 2:
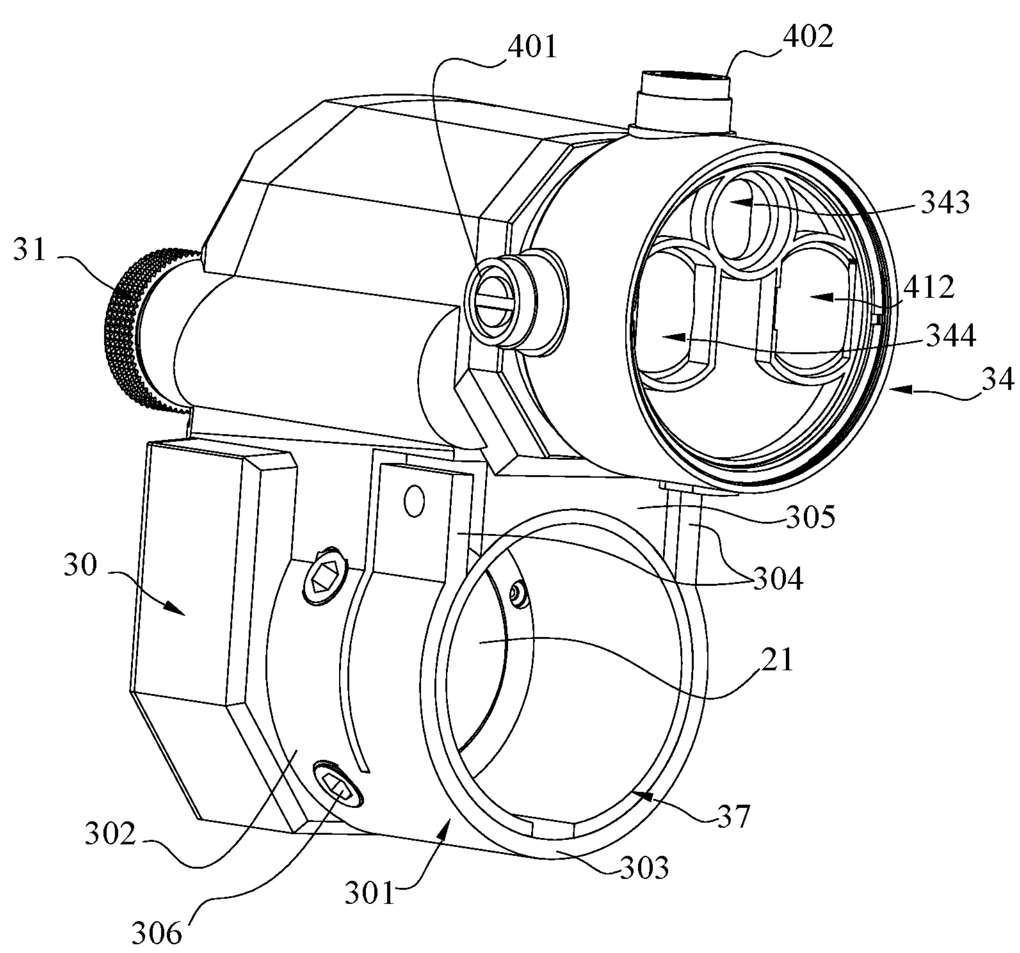

Referring to FIGS. 1 and 2, an sighting apparatus 1 according to an embodiment of the present disclosure includes a sighting telescope 2 and an imaging rangefinder 3. The sighting telescope 2 may be a conventional sighting telescope, such as a white-light sighting telescope and a night-vision sighting telescope. The imaging rangefinder 3 is attached behind an eyepiece 21 of the sighting telescope 2. In this embodiment, the imaging rangefinder 3 is mounted on an eyepiece sleeve 22 of the sighting telescope 2. Alternatively, the imaging rangefinder may be directly used as an eyepiece system of the sighting telescope. In order to more clearly show a positional relationship of respective components and modules of the imaging rangefinder 3, some wires and electronic components are omitted in the drawings shown herein.

Figure 3:
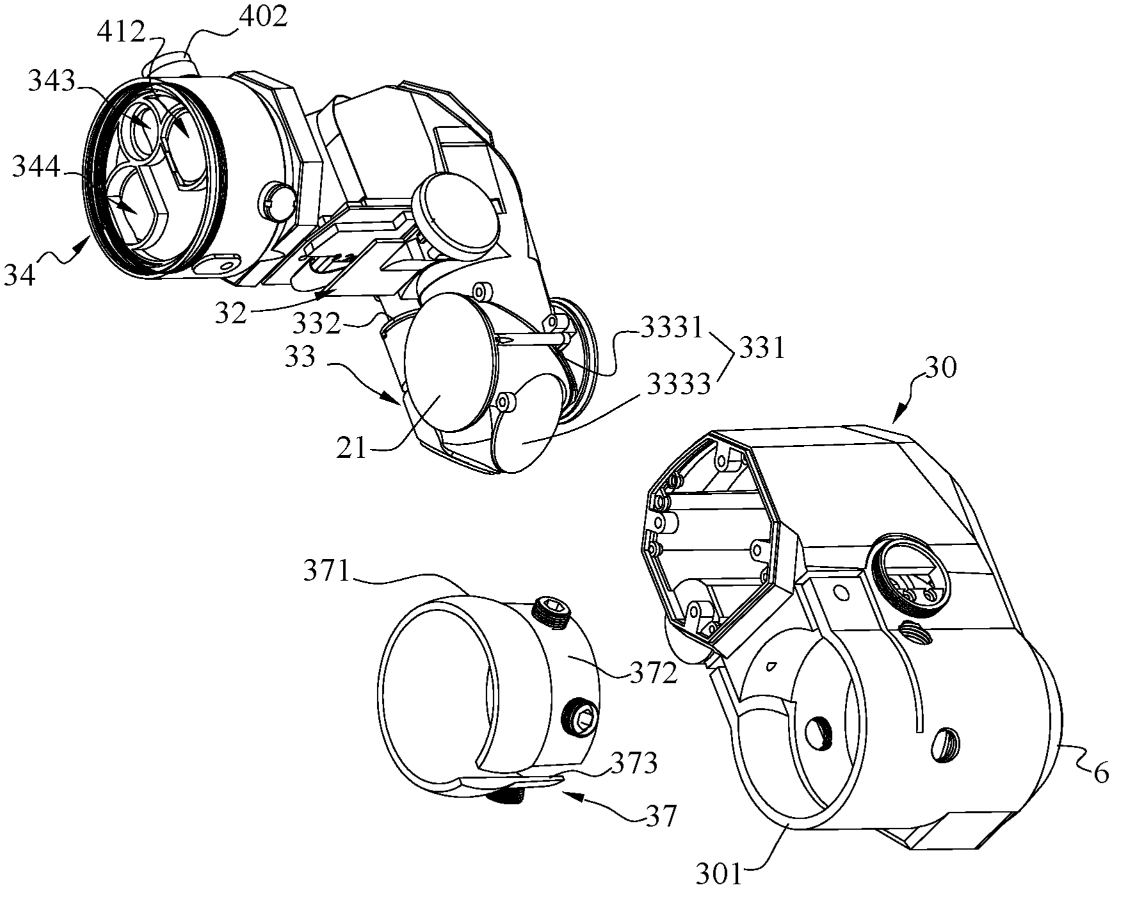
FIG. 3 is an exploded view of an imaging rangefinder of the sighting apparatus shown in FIG. 1.
Figure 4:
FIG. 4 is a cross-sectional view of an imaging rangefinder of the sighting apparatus shown in FIG. 1.
Figure 4:
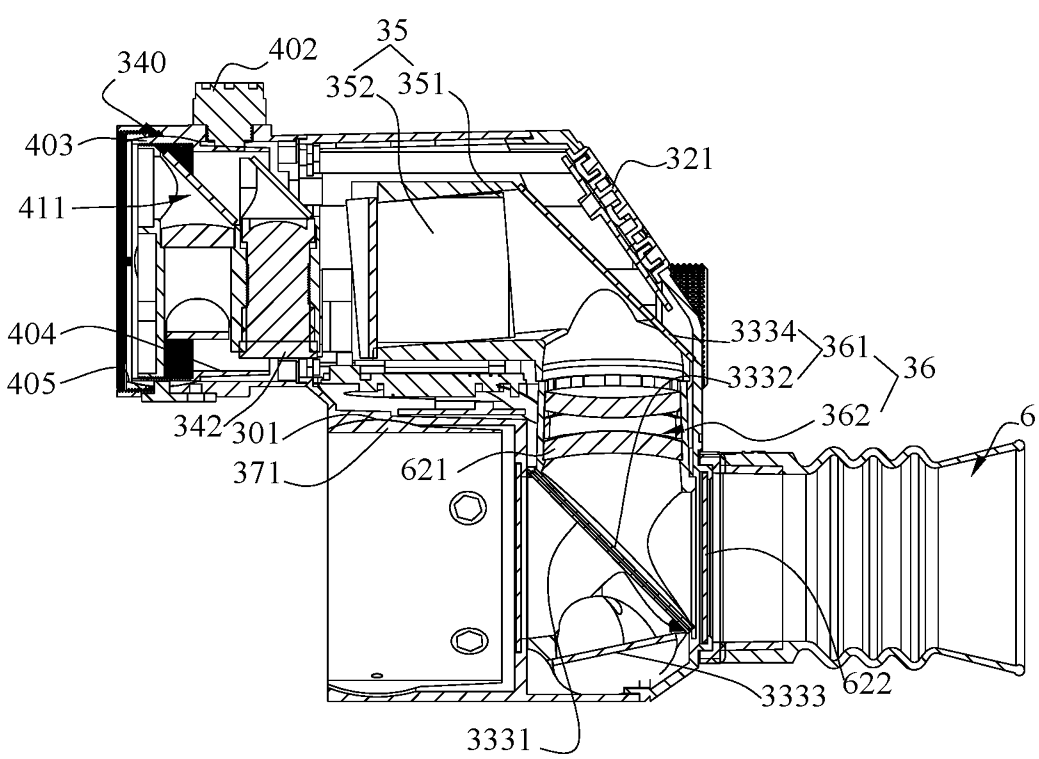

Referring to FIGS. 2 to 4, the imaging rangefinder 3 includes a housing 30, a power source 31 disposed in the housing 30, a control module 32 electrically connected to the power source 31, and an imaging module 33 electrically connected to the control module 32, a ranging imaging module 34 electrically connected to the control module 32, a display module 35 electrically connected to the control module 32, and an eyepiece system 36 showing an image formed by the display module 35. The image shown by the display module 35 includes an image from the sighting telescope 2, an image from the ranging imaging module 34, and ranging information and ranging aiming points from the ranging imaging module 34, that is, the image on a target obtained by the sighting telescope 2 is displayed by the display module 35 together with the ranging image and the ranging information on the target obtained by the imaging rangefinder.

In this embodiment, the imaging rangefinder 3 is connected to the sighting telescope 2 through a first adjusting element 37 provided inside the housing 30. The first adjusting element 37 is sleeved on the eyepiece sleeve 22 of the sighting telescope 2. Preferably, the first adjusting element 37 is locked to the eyepiece sleeve 22 by a screw 306. Alternatively, the first adjusting element may be mounted on the eyepiece sleeve 22 by screwing, snapping, or the like. The imaging module 33 is provided behind the eyepiece 21 of the sighting telescope 2 adjacent to the first adjusting element 37. The housing 30 is rotatable relative to the first adjusting element 37 to adjust a position of the imaging rangefinder 3 relative to the sighting telescope 2, thereby adjusting an optical axis center of the imaging module 33, and aim points of visible area of the imaging rangefinder 3 and of the sighting telescope 2 can be locate at an exact center of a field of view as much as possible. In this embodiment, the first adjusting element 37 is configured as a sleeve-like structure having a ball head. Specifically, the first adjusting element 37 includes a first ball head 371 adjacent to the eyepiece 21 of the sighting telescope 2 and a cavity 372 extending axially from the first ball head 371. The sleeve-like first adjusting element 37 is provided with an opening 373 in a sleeve wall along its axial length. An inner diameter of the first adjusting element 37 can be adjusted through the opening 373 to accommodate eyepiece sleeves of different sizes of sighting telescopes.

The housing 30 includes an engaging portion 301 corresponding to the first ball head 371 and a body 302 for accommodating internal components of the imaging rangefinder 3. The engaging portion 301 is substantially U-shaped. The engaging portion 301 is arranged at an axial end of the body 302. A radially inner side of the engaging portion 301 is recessed along a radial direction thereof to engage the first ball head 371. In this embodiment, there is a gap between the cavity 372 of the first adjusting element 37 and the body of the housing 30 to facilitate rotation of the housing 30 relative to the first adjusting element 37. After the first adjusting element 37 is mounted on the sighting telescope 2, a position of the housing 30 relative to the first adjusting element 37 is adjusted by a cooperation of the first ball head 371 and the engaging portion 301, so that the position of the imaging rangefinder 3 with respect to the sighting telescope 2 is adjusted to achieve an adjustment of the optical axis center of the imaging rangefinder 3. In this embodiment, the engaging portion 301 is substantially provided as a U-shaped hoop. The substantially U-shaped engaging portion 301 includes a closing end 303 and two legs 304 extending from the closing end 303. The closing end 303 is connected to the body 302 of the housing 30. A gap is formed between each of the two legs 304 and the body 302. A distance between the two legs 304 may be adjusted. The housing 30 further includes a connecting portion 305 provided at an open end of the engaging portion 301. The connecting portion 305 is arranged between the two legs 304 and is spaced apart from each leg by a distance. After the position of the imaging rangefinder 3 with respect to the sighting telescope 2 is adjusted, a distance between each leg and the connecting portion 305 is shortened by a fastener (for example, an adjusting screw) connected to the two legs 304 and the connecting portion 305, so that the housing 30 is locked to the first adjusting element 37, that is, the imaging rangefinder 3 is locked to the sighting telescope 2, and the optical axis center of the imaging module 33 coincides with the optical axis center of the eyepiece 21 of the sighting telescope 2.

Figure 5:
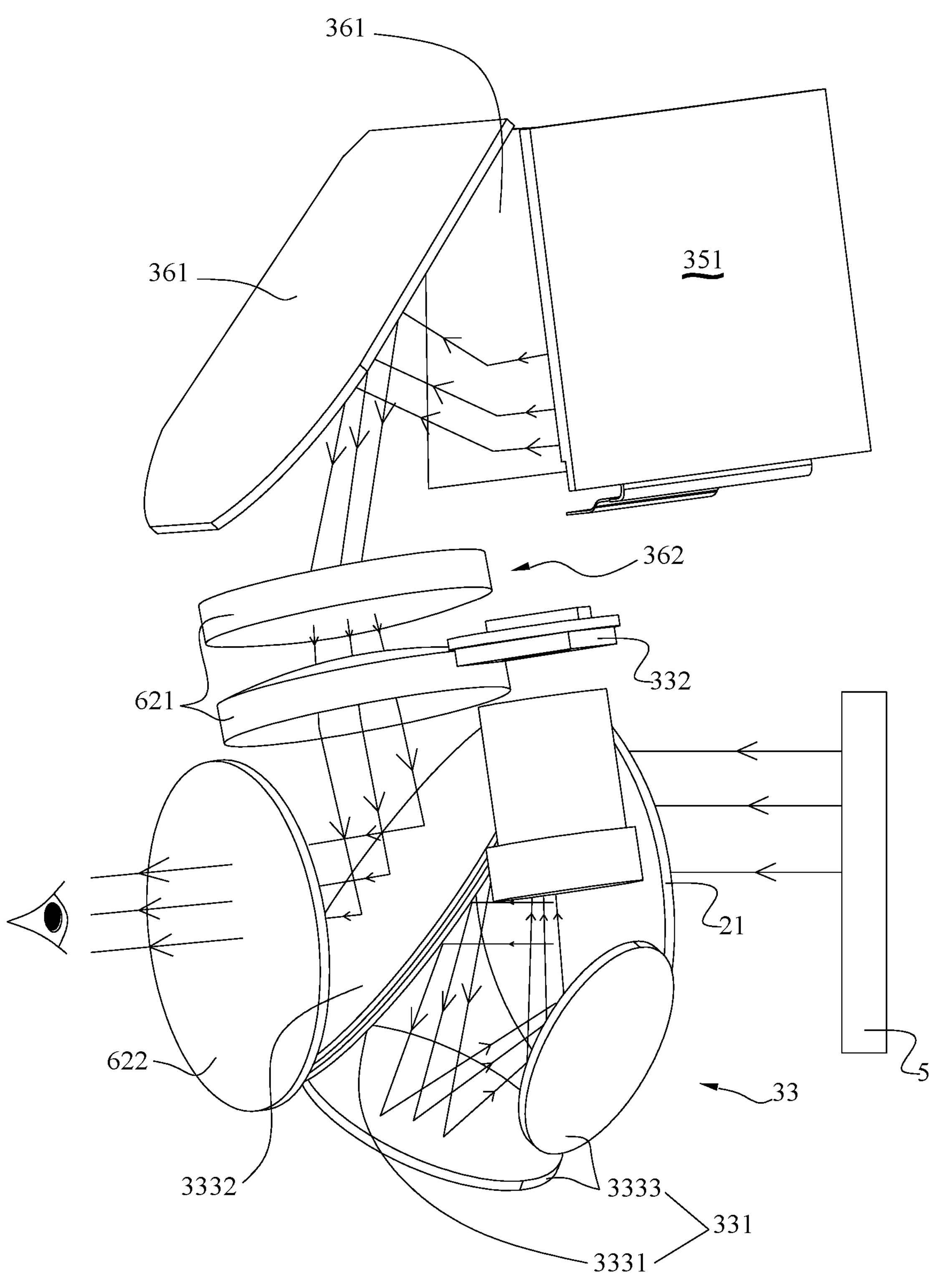
FIG. 5 is a schematic view of a first optical path and a third optical path of the imaging rangefinder shown in FIG. 2.
Figure 6:
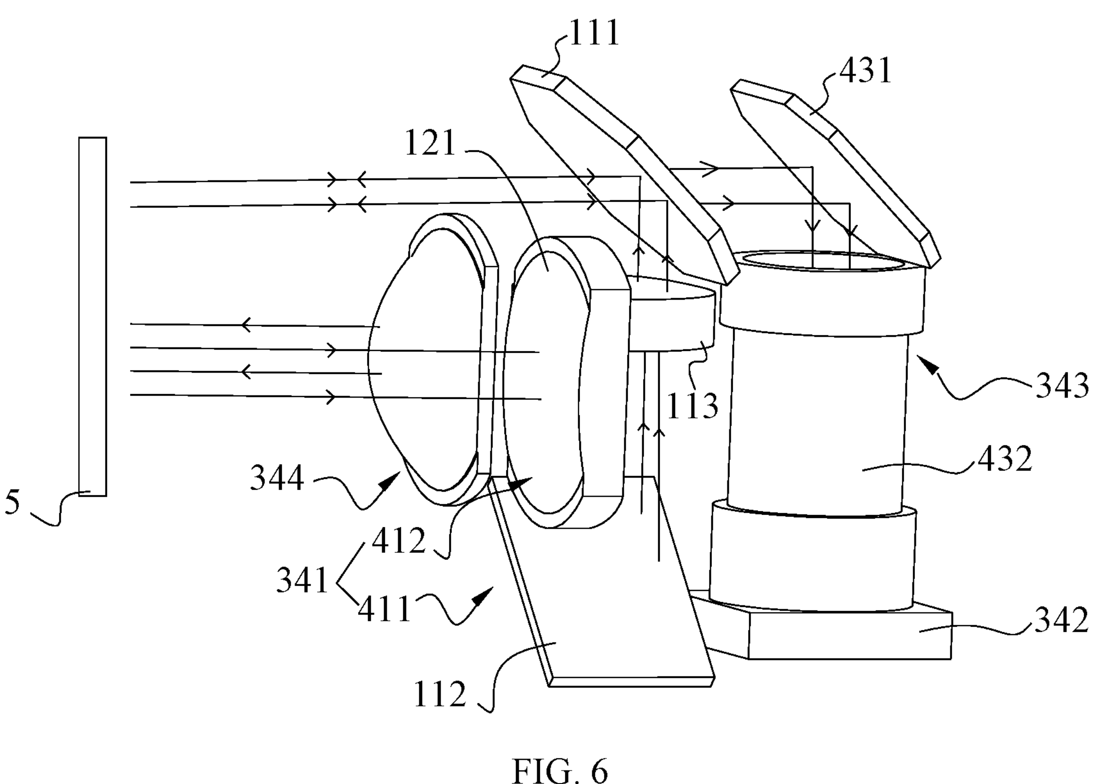
FIG. 6 is a schematic view of a second optical path of the imaging rangefinder shown in FIG. 2.

The imaging module 33 includes a first reflecting system 331 and a first imaging sensor 332. Optical paths of the sighting telescope 2 are folded and reflected by the first reflecting system 331 to the first imaging sensor 332, and the first imaging sensor 332 converts an optical signal into an electrical signal. The first imaging sensor 332 is electrically connected to the control module 32 and transmits the electrical signal to the control module 32. In this embodiment, the first imaging sensor 332 is arranged perpendicular to the sighting telescope 2. Referring to FIGS. 5 and 6, the first reflecting system 331 includes a first reflecting mirror 3331 arranged behind the eyepiece of the sighting telescope and at least one second reflecting mirror 3333 which is arranged between the first reflecting mirror 3331 and the eyepiece 21 of the sighting telescope 2. In this embodiment, the at least one second reflecting mirror 3333 includes a plurality of second reflecting mirrors, preferably two second reflecting mirrors. An angle and relative position between the first reflecting mirror 3331 and the second reflecting mirror 3333 may be any angle and position satisfying the reflecting imaging condition. Therefore, referring to FIG. 5 at the same time, by the above arrangement, the optical path emitted from the sighting telescope 2 is folded to the first imaging sensor 332 via the first reflecting system 331, a safe visual distance (exit pupil distance) of an human eye to the sighting telescope 2 is shortened. Alternatively, the first reflecting mirror and the second reflecting mirror may include a plurality of reflecting prisms, or a combination of a plurality of reflecting mirrors and reflecting prisms. In this embodiment, the first reflecting mirror 3331 is arranged behind the eyepiece of the sighting telescope. The first reflecting mirror 3331 is arranged substantially on the optical axis of the sighting telescope 2. The optical path from the eyepiece 21 of the sighting telescope 2 is first reflected by the first reflecting mirror 3331, and then reflected to the first imaging sensor 332 via the second reflecting mirror 3333. Preferably, the first reflecting mirror 3331 is arranged obliquely in front of the eyepiece 21 of the sighting telescope 2, wherein an upper end of the first reflecting mirror 3331 is adjacent to the eyepiece 21 and a lower end is far away from the eyepiece 21.

The ranging imaging module 34 is movably assembled in the housing 30 through a second adjusting element 340. In this embodiment, the second adjusting element 340 is configured as a sleeve-like structure having a ball head. Optical elements of the ranging imaging module 34 are arranged in the second adjusting element 340. Preferably, the housing 30 is provided with a lateral moving mechanism 401 and a longitudinal moving mechanism 402 for driving the second adjusting element 340 to move relative to the housing 30 in the lateral and longitudinal directions, respectively, in this way, a rotation of the ranging imaging module 34 in the housing 30 is controlled so that an image of the ranging imaging module 34 is aligned with an image of the imaging module 33 which is coincided with an observation center of the sighting telescope 2, so that data obtained by the ranging imaging module 34 is data of an object being observed by the sighting telescope 2. In this embodiment, the second adjusting element 340 includes a second ball head 403 and a main body 404 extending axially from an end of the second ball head 403. The housing 30 is provided with a recess 405 on an inner side corresponding to the second ball head 403, and the second ball head 403 is engaged with the recess 405.

The ranging imaging module 34 includes a laser ranging unit 341, an imaging unit 343, and a second imaging sensor 342. The laser ranging unit 341 is electrically connected with the control module 32 to provide the ranging information and the ranging aiming point, and the second imaging sensor 342 converts an optical signal from the imaging unit 343 into an electrical signal, and transmits the electrical signal to the control module 32. In addition, the ranging imaging module 34 further includes an infrared source unit 344 for providing night-vision infrared illumination for the sighting telescope 2 and the imaging unit 343. Thus, the sighting telescope 2 provided with the imaging rangefinder 3 can have a night vision function. In this embodiment, an infrared source unit 344 (infrared night vision lamp) is provided in the second adjusting element 340 perpendicular to an axis of the second adjusting element 340.

In this embodiment, the laser ranging unit 341 includes a laser emitting unit 411 for emitting a laser beam to a target and a laser receiving unit 412 for receiving the reflected laser beam, and the imaging unit 343 is configured to receive natural light and form an image, and the laser emitting unit 411 forms a laser emitting optical path, the laser receiving unit 412 forms a laser receiving optical path, and the imaging unit 343 forms a natural light observation optical path, an axis of the laser emitting optical path, an axis of the laser receiving optical path, and an axis of the natural light observation optical path are coaxial with each other, and three axes overlap each other.

Preferably, the laser emitting unit 411 includes a laser emitter for emitting a laser beam, a laser emitting mirror 113 for collimating the laser beam, a laser reflecting mirror 112 for reflecting the laser beam, and a dichroic mirror 111 for reflecting laser and allowing natural light to pass therethrough. In this embodiment, the laser reaches the dichroic mirror 111, is reflected again, and reaches a target 5. The laser receiving unit 412 includes a laser receiving mirror 121 for condensing the laser beam turned back from the target 5, and a laser receiver for receiving the condensed laser beam. Both the laser receiving mirror 121 and the dichroic mirror 111 are arranged toward the target 5. Preferably, the laser receiving mirror 121 is arranged perpendicular to an axis of the second adjusting element 340. In this embodiment, the dichroic mirror 111 is arranged in the second adjusting element 340 obliquely with respect to the axis of the second adjusting element 340. Preferably, the laser receiver converts the received optical signal into an electrical signal. The imaging unit 343 may be a white light imaging unit or a digital imaging unit. In this embodiment, the imaging unit 343 is described by taking the digital imaging unit as an example. The imaging unit 343 includes the dichroic mirror 111 that allows natural light to pass through and reflects laser light, and an imaging mirror 432 for condensing natural light. The second imaging sensor 342 receives natural light condensed via the imaging mirror 432.

The first imaging sensor 332 of the imaging module 33 is electrically connected to the control module 32, and the second imaging sensor 342 of the ranging imaging module 34 is also electrically connected to the control module 32. Thus, the electric signal about the observation optical path of the first imaging sensor 332 and the electric signal about the distance-measuring optical path of the second imaging sensor 342 are both transmitted to the control module 32. The control module 32 processes the obtained electrical signals such that an image relating to the observation optical path and an image relating to the distance-measuring optical path are simultaneously displayed on the display module 35.

Preferably, the control module 32 includes a processing unit and an arithmetic unit. The processing unit records a time period from an emission of a laser beam to a return, and the arithmetic unit calculates a distance of the target 5 based on the time period and a speed of the laser beam. Optionally, the ranging imaging module may further include an angle sensor for comprehensively measuring an angle of the target, a temperature and humidity sensor for measuring temperature and humidity of a surrounding environment, a barometric pressure sensor for measuring an atmospheric pressure of the surrounding environment, a wind speed and direction sensor for measuring a wind speed and direction of the surrounding environment, or a satellite positioning system for receiving global positioning data of the target, such as latitude and longitude, altitude, etc. The arithmetic unit corrects a calculation result based on data information such as temperature, humidity, barometric pressure, wind speed, wind direction and the like of the surrounding environment detected by the ranging imaging module, so that the influence of various environmental factors can be overcome and the accuracy can be guaranteed. Thus, the ranging information with high accuracy is displayed on the display module 35.

The display module 35 includes a display driver board 351 and a display screen 352 mounted on the display driver board 351. The display driver board 351 is electrically connected to the control module 32, and the data of the control module 32 is read and sent to the display screen 352 for display. The display screen 352 may be an OLED display screen, a TFT display screen, an LCD display screen, a digital tube display screen, etc. In this embodiment, the display screen 352 has a size of 1.54 inches. It should be understood that, due to the respective optical path characteristics of the sighting telescope 2 and the imaging rangefinder 3, that is, the optical path of the sighting telescope 2 is aimed at high magnification (long-focus) accurate striking, and the laser distance measuring optical path of the imaging rangefinder 3 is for small magnification (wide angle) search distance measuring, two images can be provided to the user at the same time, thereby improving the usability of the sighting apparatus 1.

The image and data shown on the display screen 352 are refracted and turned by the eyepiece system 36, and then projected into the user's eye along the optical path of the sighting telescope 2. The eyepiece system 36 includes a second reflecting system 361 and a plurality of lenses 362. The second reflecting system 361 includes a third reflecting mirror 3332 and at least one fourth reflecting mirror 3334, and the plurality of lenses 362 are arranged between the third reflecting mirror 3332 and the at least one fourth reflecting mirror 3334. It is conceivable that an angle between the third reflecting mirror 3332 and the at least one fourth reflecting mirror 3334 and the relative position between the third reflecting mirror 3332 and the at least one fourth reflecting mirror 3334 may be any angle and position satisfying the reflecting imaging condition. The plurality of lenses 362 are coupling mirrors. In this embodiment, the third reflecting mirror 3332 is arranged between the eyepiece 622 of the eyepiece system and the first reflecting mirror 3331. Preferably, the third reflecting mirror 3332 is disposed parallel to the first reflecting mirror 3331. It is conceivable that the first reflecting mirror 3331 and the third reflecting mirror 3332 may be arbitrarily arranged as long as they satisfy any angle and position of the reflecting imaging condition. In this embodiment, the first reflecting mirror 3331 and the third reflecting mirror 3332 are provided for the purpose of separately adjusting the imaging module 33 and the eyepiece system 36, thereby reducing the adjustment difficulty and facilitating the operation of the user.

In this embodiment, a glass sheet 622 is provided on the optical axis of the sighting telescope 2 and parallel to the eyepiece 21 of the sighting telescope 2, and an axis of the optical path observed through the glass sheet 622 is coaxial with the axis of the optical path of the eyepiece 21 of the sighting telescope 2. The coupling mirror 621 is provided above the third reflecting mirror 3332. Optical paths refracted by the fourth reflecting mirror 3334 of the plurality of second reflecting systems 361 are transmitted through the coupling mirror 621, projected to the third reflecting mirror 3332, and deflected by the third reflecting mirror 3332, and finally projected into the user's eye via the glass sheet 622. In this embodiment, an eyepiece hood 6 detachably mounted on the housing 30 is provided adjacent to the glass sheet 622 of the eyepiece system, which is used to cover an outer periphery of the glass sheet 622. Preferably, the eyepiece hood 6 is a short eyepiece hood. It is conceivable that the short eyepiece hood 6 can be replaced by a long eyepiece hood. In this embodiment, the at least one fourth reflecting mirror 3334 includes a plurality of fourth reflecting mirrors, preferably two fourth reflecting mirrors.

Figure 7:
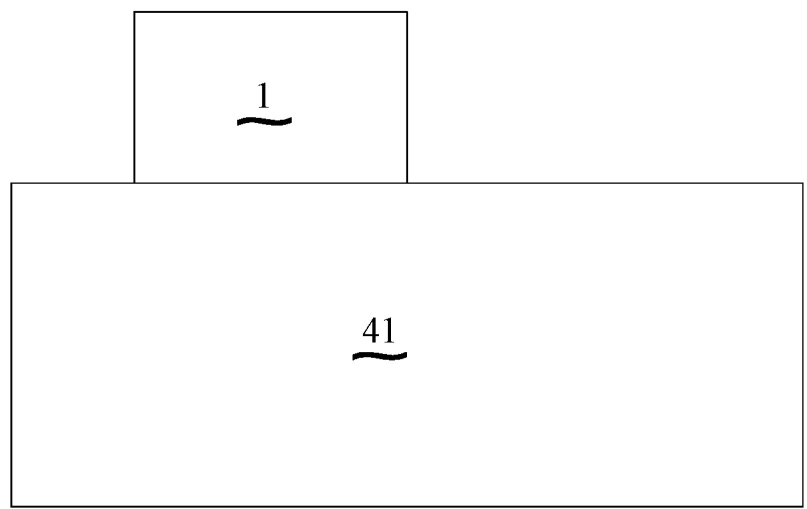
FIG. 7 shows a shooting device according to an embodiment of the present disclosure.
Figure 8:
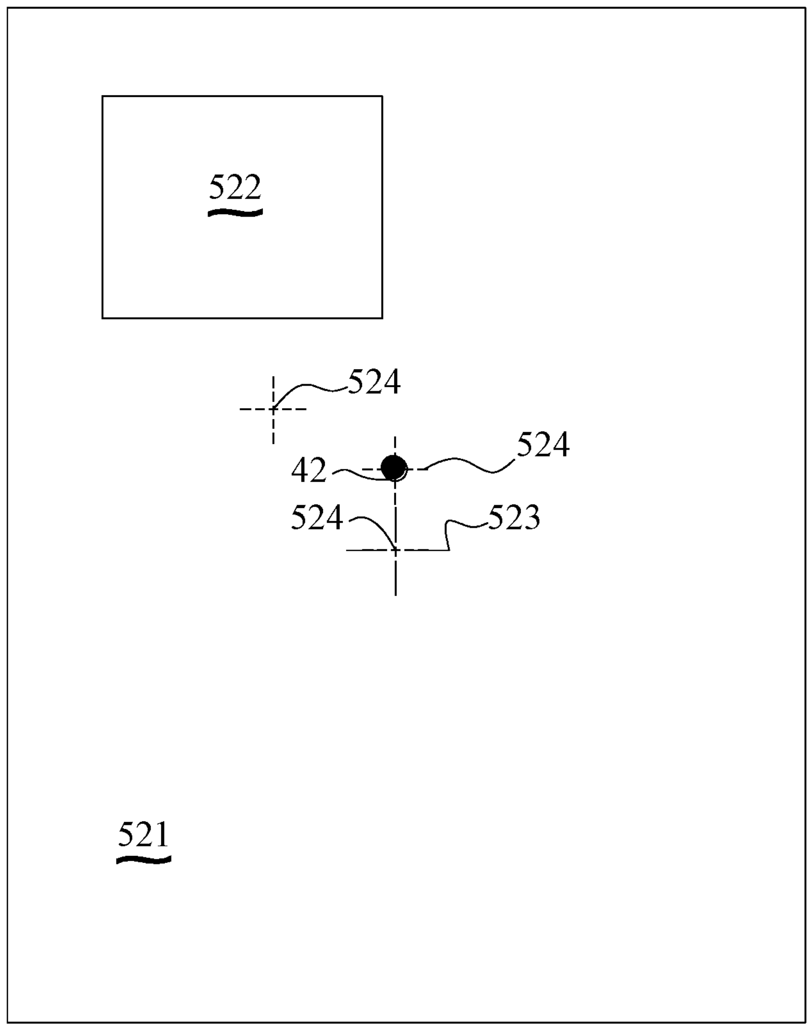
FIG. 8 shows a schematic view as viewed through an eyepiece system of an imaging rangefinder of the present disclosure.

Referring to FIGS. 7 and 8, the user views the image shown on the display screen 352 through the eyepiece system 36 described above. The image shown on the display screen 352 includes an image display area of the sighting telescope 521 and a laser ranging indication display area 522. The laser ranging indication display area 522 is located within the image display area of the sighting telescope 521. Optionally, the image display area of the sighting telescope 521 may also be located within the laser ranging indication display area 522. In addition, a sight radius of the sighting telescope 523 and an aiming point of the imaging rangefinder 524 are also shown in the display screen 352. When the imaging rangefinder 3 is used, the user can adjust the aiming point of the imaging rangefinder 524 such that the aiming point of the imaging rangefinder 524 coincides with an center of the sight radius of the sighting telescope 523.

Further, the eyepiece hood 6 in the second embodiment is a long eyepiece hood, but it may be replaced with a short eyepiece hood. The specific size of the eyepiece hood 6 may be selected according to the actual use.

The user can adjust a position of the imaging rangefinder 3 relative to the sighting telescope 2 through the first adjusting element 37 and the second adjusting element 340 so that the aiming point of the imaging rangefinder 3 coincides with the center of the sight radius of the scope 2. In addition, the user can also control the control module 32 through buttons 321 provided on the housing 30 to move the aiming point of the imaging rangefinder 3 to the center of the sight radius of the sighting telescope 2, in order to achieve their coincidence. Specifically, the buttons 321 are electrically connected to the control module 32, and the buttons 321 are pressed to move a position of the aiming point of the imaging rangefinder in the display screen in such a manner that a position of a display icon is changed. The aiming point of the imaging rangefinder in the display screen is made to coincide with the center of the sight radius of the sighting telescope (as shown in FIG. 8, the sight radius of the sighting telescope 523 indicated by the solid lines coincides with the aiming point of the imaging rangefinder 524 indicated by the dotted lines). After the aiming point of the imaging rangefinder 3 coincides with the center of the sight radius of the sighting telescope 2, a recording operation of the optical observation original base point is realized.

As shown in FIG. 7, the present disclosure also provides a shooting device 4 including a gun 41 and the aforementioned sighting apparatus 1 mounted on the gun 41. An adjustment of a shooting base point of the shooting device 4 is illustrated below with reference to FIGS. 1, 3 and 8.

A first method for adjusting the shooting base point is: after the aiming point of the imaging rangefinder 3 coincides with the center of the sight radius of the sighting telescope 2, other methods of operation of the sighting apparatus 1 of the shooting device 4 are used to operate the device directly according to the methods of operation of previous conventional optical devices, but the aiming point of the imaging rangefinder 3 of the sighting apparatus 1 is only a secondary zero point of the conventional device, and the user can operate the sighting apparatus 1 arbitrarily; after hitting the target, the center of the sight radius of the sighting telescope 2 is set to coincide with the aiming point of the imaging rangefinder 3 in order to return to an original zero point, at this time, the aiming point of the imaging rangefinder 3 is used only as the recording point of the aiming base point, and the conventional required manual recording (handwriting, memorization, etc.) zero point is visualized.

The second method for adjusting the shooting base point is: after the aiming point of the imaging rangefinder 3 coincides with the center of the sight radius of the sighting telescope 2, the aiming base point of the sighting apparatus 1 is adjusted to coincide with a trajectory of the gun 41, at this time, the sighting telescope 2 and the gun 41 have been zeroed at a certain specific distance, and the adjusting mechanism of the imaging rangefinder 3 is locked and no longer used, the buttons 321 provided on the housing 30 is used to control the aiming point of the imaging rangefinder 3 on the display screen for other distance and windage correction, after hitting the target, the aiming point of the imaging rangefinder 3 will need to be reset to the aiming base point of the locked sighting telescope to complete the second zeroing of the sighting apparatus.

The third method for adjusting the shooting base point is an automatic adjustment. First, it is confirmed whether the gun 41, the sighting telescope 2 and the aiming point of the imaging rangefinder 524 are correct or not by hitting the target at the zero point of a specific distance with the adjusted gun 41 and the sighting telescope 2, for example, the zero point of a specific distance is at 100 meters, at this time, the laser ranging point also needs to return to zero at 100 meters. At this time, the respective aiming base points of the gun 41, the sighting telescope 2, and the imaging rangefinder 3 are all zeroed at 100 meters. At this time, a teaching mode menu of the sighting telescope 2 of the sighting apparatus 1 is opened, and at the same time, the target of 50 meters is hit with the gun 41 zeroed at 100 meters, after hitting, a impact point 42 appears just above the aiming base point (assume no wind deflection). At this time, the sighting telescope 2 is still pointing to a center of the target, and the aiming point of the imaging rangefinder 524 is manually adjusted to the impact point of 50 meters (as shown in FIG. 8, the aiming point of the imaging rangefinder 524 indicated by the dotted lines coincides with the impact point 42), and a record is completed. Turning on the teaching mode again, the target is hit with the gun zeroed at 100 meters, and the position of the target is moved to a distance of, for example, 150, 200, 250 meters, etc. (this distance may be an integer or a random value); after each hit, the aiming point of the imaging rangefinder 524 is adjusted to the corresponding impact point and is recorded and locked, and the imaging rangefinder 3 records the corresponding laser distance-measuring data once every time the aiming point is locked. Thus, when the shooting device exiting the teaching mode starts hitting the target, the control module of the imaging rangefinder automatically adjusts the aiming base point each time according to the value measured by the laser distance-measuring, and the user may hit the target according to the position of the aiming point of the imaging rangefinder 524 at which the imaging rangefinder is finally moved.

The above is only preferred embodiments of the present disclosure, and is not intended to limit the present disclosure. Any simple change or equivalent replacement of the technical solution that can be easily obtained by any person familiar with the technical field within the technical scope disclosed by the disclosure falls within the protection scope of the disclosure.

The invention claimed is:

1. An imaging rangefinder adjustably mounted on a sighting telescope, comprising:

a power supply, a control module electrically connected to the power supply, an imaging module electrically connected to the control module, a ranging imaging module electrically connected to the control module, a display module electrically connected to the control module, and an eyepiece system showing an image shown by the display module, wherein an image from the sighting telescope is transmitted to the control module via the imaging module, the image shown by the display module comprises the image from the sighting telescope, an image from the ranging imaging module, and ranging information and ranging aiming point from the ranging imaging module; and wherein the imaging module comprises a first reflecting system and a first imaging sensor, optical paths of the image from the sighting telescope are folded and reflected by the first reflecting system to the first imaging sensor, and the first imaging sensor converts an optical signal into an electrical signal and transmits the electrical signal to the control module.

2. The imaging rangefinder according to claim 1, wherein the first reflecting system comprises a first reflecting mirror arranged behind an eyepiece of the sighting telescope and at least one second reflecting mirror which is arranged between the first reflecting mirror and the eyepiece of the sighting telescope.

3. The imaging rangefinder according to claim 1, wherein the ranging imaging module comprises a laser ranging unit, an imaging unit, and a second imaging sensor, the laser ranging unit is electrically connected with the control module to provide the ranging information and the ranging aiming point, and the second imaging sensor converts an optical signal from the imaging unit into an electrical signal, and transmits the electrical signal to the control module.

4. The imaging rangefinder according to claim 3, wherein the laser ranging unit comprises a laser emitting unit for emitting a laser beam to a target and a laser receiving unit for receiving a reflected laser beam, and the imaging unit is configured to receive natural light and form an image, and the laser emitting unit forms a laser emitting optical path, the laser receiving unit forms a laser receiving optical path, and the imaging unit forms a natural light observation optical path, an axis of the laser emitting optical path, an axis of the laser receiving optical path, and an axis of the natural light observation optical path are coaxial with each other, and three axes overlap each other.

5. The imaging rangefinder according to claim 4, wherein the laser emitting unit comprises a dichroic mirror for reflecting laser and allowing natural light to pass therethrough, the imaging unit comprises the dichroic mirror and an imaging mirror for condensing natural light, and the second imaging sensor receives natural light condensed via the imaging mirror.

6. The imaging rangefinder according to claim 3, wherein the ranging imaging module further comprises an infrared source unit for providing night-vision infrared illumination for the sighting telescope and the imaging unit.

7. The imaging rangefinder according to claim 1, wherein the display module comprises a display driver board and a display screen mounted on the display driver board, the display driver board is electrically connected to the control module, and data of the control module is read and sent to the display screen for display.

8. The imaging rangefinder according to claim 7, wherein the image and data shown on the display screen are refracted and turned by the eyepiece system, and then projected from the imaging rangefinder along an optical path of the sighting telescope.

9. The imaging rangefinder according to claim 2, wherein the eyepiece system comprises a second reflecting system and a plurality of lenses.

10. The imaging rangefinder according to claim 9, wherein the second reflecting system comprises a third reflecting mirror and at least one fourth reflecting mirror, and the plurality of lenses are arranged between the third reflecting mirror and the at least one fourth reflecting mirror.

11. The imaging rangefinder according to claim 1, wherein the imaging rangefinder further comprises a housing which accommodates the power supply, the control module, the imaging module, the ranging imaging module and the eyepiece system, the housing is connected with the sighting telescope by a first adjusting element provided inside the housing, and the housing is rotatable relative to the first adjusting element to adjust a position of the imaging module relative to the sighting telescope, so that an optical axis of the imaging rangefinder and an optical axis of the sighting telescope are coaxial.

12. The imaging rangefinder according to claim 11, wherein the ranging imaging module is movably assembled in the housing through a second adjusting element, so that a position of the ranging imaging module relative to the sighting telescope is adjusted.

13. The imaging rangefinder according to claim 12, wherein the housing is provided with a lateral moving mechanism and a longitudinal moving mechanism for driving the second adjusting element to move relative to the housing in the lateral and longitudinal directions, respectively.

14. A sighting apparatus comprising a sighting telescope and an imaging rangefinder connected with the sighting telescope, wherein the imaging rangefinder is an imaging rangefinder according to claim 1.

15. A shooting device comprising a gun and a sighting apparatus mounted on the gun, wherein the sighting apparatus is a sighting apparatus according to claim 14.

16. A method for adjusting a shooting base point of a shooting device according to claim 15, wherein the method comprises:

a. adjusting an aiming point of the imaging rangefinder to coincide with a center of a sight radius of the sighting telescope;

b. adjusting the center of sight radius of the sighting telescope to coincide with a trajectory of the gun, so that the sighting apparatus and the gun are zeroed at a certain distance;

c. opening a teaching mode menu of the sighting telescope, and simultaneously hitting a target at other distance with a gun zeroed at a certain distance, and displaying an impact point on the display module after the hitting is completed;

d. manually adjusting the aiming point of the imaging rangefinder to the impact point of the other distance, and completing the recording;

e. repeating steps c and d for a target at a distance different from the certain distance; and f. automatically adjusting the aiming point of the imaging rangefinder according to a value measured by the imaging rangefinder under the control module of the imaging rangefinder when the shooting device exiting the teaching mode starts hitting the target, and hitting the target according to the aiming point of the imaging rangefinder.

* * * * *